US009264316B2

(12) United States Patent
Gu et al.

(10) Patent No.: US 9,264,316 B2
(45) Date of Patent: Feb. 16, 2016

(54) METHOD AND NETWORK NODE

(75) Inventors: Xinyu Gu, Beijing (CN); Stephen Grant, Pleasanton, CA (US); Niklas Johansson, Uppsala (SE); Torbjörn Wigren, Uppsala (SE); Zhang Zhang, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1051 days.

(21) Appl. No.: 13/388,558

(22) PCT Filed: Jan. 2, 2012

(86) PCT No.: PCT/SE2012/050001
§ 371 (c)(1),
(2), (4) Date: Feb. 2, 2012

(87) PCT Pub. No.: WO2013/081520
PCT Pub. Date: Jun. 6, 2013

(65) Prior Publication Data
US 2013/0136012 A1 May 30, 2013

Related U.S. Application Data

(60) Provisional application No. 61/563,877, filed on Nov. 28, 2011.

(51) Int. Cl.
*H04L 12/24* (2006.01)

(52) U.S. Cl.
CPC ............ *H04L 41/147* (2013.01); *H04L 41/142* (2013.01)

(58) Field of Classification Search
None
See application file for complete search history.

(56) References Cited

U.S. PATENT DOCUMENTS 7,408,975 B2 * 8/2008 Bar-Ness et al. ............. 375/141
7,738,907 B2 * 6/2010 Xiao .................... H04W 52/265
455/127.1

(Continued)

FOREIGN PATENT DOCUMENTS

WO 2007026054 A1 3/2007
WO 2011031193 3/2011
WO 2011155882 A1 12/2011

OTHER PUBLICATIONS

Wigren, Torbjorn, "Low Complexity Kalman Filtering for Inter-Cell Interference and Power Based Load Estimation in the WCDMA Uplink," International Conference on Signal Processing and Communication Systems, pp. 1-10, Dec. 14, 2011.

(Continued)

*Primary Examiner* — Chirag Shah
*Assistant Examiner* — Amar Persaud
(74) *Attorney, Agent, or Firm* — Patent Portfolio Builders, PLLC

(57) ABSTRACT

Network node (110), and method (300) in a network node (110), for load control in a cell (130) in a wireless communication system (100). The method (300) comprises starting an interference cancellation process, for reducing interference between uplink signals, estimating an interference cancellation gain, relative to an interference reduced received uplink signal power resulting from the interference cancellation process, wherein the interference cancellation gain is estimated after the start of the interference cancellation process but before the interference cancellation process is completed. In addition, the method (300) comprises controlling the traffic load of the cell (130), by considering the estimated interference cancellation gain.

18 Claims, 7 Drawing Sheets

(56) References Cited

U.S. PATENT DOCUMENTS

| | | | |
|---|---|---|---|
| 8,949,683 B1* | 2/2015 | Sun | H03M 13/09 714/758 |
| 2007/0054619 A1 | 3/2007 | Kinnunen et al. | |
| 2007/0270100 A1* | 11/2007 | Agrawal et al. | 455/67.11 |
| 2009/0088080 A1 | 4/2009 | Zhang et al. | |
| 2009/0312042 A1* | 12/2009 | Rudrapatna | 455/501 |
| 2010/0087221 A1* | 4/2010 | Srinivasan et al. | 455/522 |
| 2010/0220824 A1* | 9/2010 | Guess | H04B 1/71075 375/346 |
| 2011/0044378 A1* | 2/2011 | Guess | H04B 1/71075 375/148 |
| 2012/0147828 A1 | 6/2012 | Wigren | |
| 2012/0224449 A1* | 9/2012 | Harris | B28C 5/1875 366/2 |
| 2013/0136012 A1* | 5/2013 | Gu | H04L 41/147 370/252 |

OTHER PUBLICATIONS

Wigren, Torbjorn, "Soft Uplink Load Estimation in WCDMA," IEEE Transactions on Vehicular Technology, vol. 58, No. 2, Feb. 2009.

Zhang, Danlu et al. "HSUPA Scheduling Algorithms Utilizing RoT Measurements and Interference Cancellations," International Conference on Communications, pp. 5033-5037, May 23, 2008.

Wei, Bai et al., "A Novel Resource Allocation Method for HSUPA with Successive Interference Cancellation", 2008 IEEE 68th Vehicular Technology Conference, Sep. 1, 2008, 1-5.

* cited by examiner

METHOD AND NETWORK NODE

TECHNICAL FIELD

Embodiments disclosed herein relate to a network node and methods in a network node. In particular, it relates to mechanisms for load control in a cell.

BACKGROUND

User equipments (UE), also known as mobile stations, wireless terminals and/or mobile terminals are enabled to communicate wirelessly in a wireless communication system, sometimes also referred to as a cellular radio system. The communication may be made e.g. between two user equipment units, between a user equipment and a regular telephone and/or between a user equipment and a server via a Radio Access Network (RAN) and possibly one or more core networks.

The user equipment units may further be referred to as mobile telephones, cellular telephones, laptops with wireless capability. The user equipment units in the present context may be, for example, portable, pocket-storable, hand-held, computer-comprised, or vehicle-mounted mobile devices, enabled to communicate voice and/or data, via the radio access network, with another entity, such as another user equipment or a server.

The wireless communication system covers a geographical area which is divided into cell areas, with each cell area being served by a network node, or base station e.g. a Radio Base Station (RBS), which in some networks may be referred to as "eNB", "eNodeB", "NodeB" or "B node", depending on the technology and terminology used. The network nodes may be of different classes such as e.g. macro eNodeBs, home eNodeBs or pico base stations, based on transmission power and thereby also cell size. A cell is the geographical area where radio coverage is provided by the network node/base station at a base station site and may also be referred to as a radio coverage area. One base station, situated on the base station site, may serve one or several cells by having one or several radio transmitters. The network nodes communicate over the air interface operating on radio frequencies with the user equipment units within range of the respective network node.

In some radio access networks, several network nodes may be connected, e.g. by landlines or microwave, to a Radio Network Controller (RNC) e.g. in Universal Mobile Telecommunications System (UMTS). The RNC, also sometimes termed a Base Station Controller (BSC) e.g. in GSM, may supervise and coordinate various activities of the plural network nodes connected thereto. GSM is an abbreviation for Global System for Mobile Communications (originally: Groupe Spécial Mobile).

UMTS is a third generation mobile communication system, which evolved from GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units.

The 3rd Generation Partnership Project (3GPP) has undertaken to evolve further the UTRAN and GSM based radio access network technologies, for example by developing the Long Term Evolution (LTE) and the Evolved Universal Terrestrial Radio Access Network (E-UTRAN).

High Speed Packet Access (HSPA) is a term encompassing two mobile telephony protocols, High Speed Downlink Packet Access (HSDPA) and High Speed Uplink Packet Access (HSUPA). HSPA extends and improves the performance of existing WCDMA protocols. It may here be mentioned that HSUPA also is known as Enhanced Uplink (EUL), in some literature, e.g. by 3GPP.

In the present context, the expressions downlink, downstream link or forward link may be used for the transmission path from the network node to the user equipment. The expression uplink, upstream link or reverse link may be used for the transmission path in the opposite direction i.e. from the user equipment to the network node.

In the HSPA uplink, the user equipments share the same time and frequency resource. When the Node B detects a signal from a specific user equipment, with a traditional RAKE receiver, the received power of the other user equipment and part of the received power of this specific user equipment, is regarded as interference to the specific user equipment at the Node B. In other words, the total received power at the Node B may be viewed as the cell load. When the total received power is high, the cell load is high. In practice, the uplink cell load is estimated in terms of the Rise Over Thermal (RoT) of the cell, which is the total received power divided by the thermal noise floor power. This may sometimes also be referred to as the noise rise, see FIG. 1A.

FIG. 1A illustrates the air interface load according to prior art. The pole capacity is the limiting theoretical bit rate of the uplink, corresponding to an infinite noise rise.

The noise rise may be seen as the total received power relative to the noise power within a cell. The noise rise is increasing with the number of user equipments and/or the radio traffic intensity within the cell. A general definition of noise rise in the linear domain is $$\eta = \frac{I_{tot}}{N}. \quad [1]$$

The total received power, $I_{tot}$, in a cell comprises uplink power from all user equipments in the own cell, $I_{own}$, uplink WCDMA radio link power from user equipments in the neighbour cells, $I_{nei}$, as well as the thermal noise floor power N thus $$I_{tot} = I_{own} + I_{nei} + N \quad [2]$$

Considering a user equipment at the cell border attempting to connect to the cell, the total received power from all user equipments at the Node B, i.e. within the cell served by the Node B, is interference to this user equipment. If the interference level is too high, the limited power of the user equipment may not be able to ensure a successful connection to the Node B. This results in a coverage problem. Therefore, a first main aim of load control of HSUPA is to control the total received power at the Node B to be below a target so that a user equipment at the cell border may connect to the cell when it wants. The target may depend on the cell size: a lower target for a larger cell size, vice versa.

Besides the rise over thermal target considering the coverage limit there is another limit which may be considered when setting the noise rise target, namely the stability limit. The reason is that if the load in the cell is too high the interference between user equipments will cause power rushes and instability of the system. To address the stability issue, current ideas include subtraction of estimates of the neighbour cell interference from the total power. This may not be perfectly true, however normally the inter-cell interference coupling between user equipments is a lot weaker than the intra-cell interference coupling between user equipments.

Therefore, the overall cell load must not exceed either the coverage or the stability limitations.

In order to control the total load in the cell to be below the rise over thermal target, and the stability noise rise target, a load estimator needs to estimate the load generated by each radio connection and the available scheduling headroom that Enhanced Dedicated Channel (E-DCH) traffic may use.

The load factor of one radio connection is defined as $$L_i = P_i/I_{tot},  \quad [3]$$

where $P_i$ is the received signal power from user channel i. The load factor estimation is the basis for load control. Therefore, for example the Dedicated Physical Control CHannel (DPCCH) load of the user equipment i is $$L_{ci} = P_{ci}/I_{tot},$$

where $P_{ci}$ is the received DPCCH power of the user equipment i. The scheduling headroom, or the maximum allowed Enhanced Dedicated Channel (E-DCH) load in the cell is thus $$L_{max\ EDCH} = L_{max\ RoT} - L_{others} - L_{nonEDCH} = 1 - 1/RoT_{target} - L_{others} - L_{nonEDCH}, \quad [4]$$

where $L_{others}$ is the summed load of the inter-cell interference and $L_{nonEDCH}$ is the summed load of the non E-DCH channels, for example DCH and High Speed (HS)-DPCCH.

$$L_{nonEDCH} = \sum_{\#nonEDCH} P_{nonEDCH}/I_{tot}. \quad [5]$$

During scheduling, the scheduler may estimate the total E-DCH load with the allocated grant by summing the load factor of the E-DCH channels.

$$L_{EDCH} = \sum_{\#EDCH} P_{EDCH}/I_{tot}. \quad [6]$$

The scheduler may also estimate the Enhanced Transport Format Combinations (E-TFC) grant that may eat up the available load room based on the E-DCH Dedicated Physical Data Channel (E-DPDCH) load factor. The E-DPDCH load factor of user equipment i with E-TFC j is $$L_{E-TFCj,i} = P_{E-TFCj,i}/I_{tot} = P_{ci} \cdot \beta_j/I_{tot}$$

where $\beta_j$ is the E-DPDCH to DPCCH power offset and is one by one mapped to the corresponding E-TFCj.

Therefore, suppose the available load room for user equipment i is $L_{avail}$, the suitable E-TFC (or corresponding power offset) may be calculated as $$\beta_j = L_{avail}/(P_{ci}/I_{tot}), \quad [7]$$

which may be referred to as load to E-TFC mapping.

The estimation of rise over thermal relies on the measurement of the total interference and knowledge of the thermal noise power floor.

To understand the desire to apply sophisticated estimation techniques to find the thermal noise power floor, it is to be noted that the signal reference point is at the antenna connector, by definition. The interference measurements are however obtained after the analogue signal conditioning chain, in the digital receiver. The analogue signal conditioning chain does introduce a scale factor error of about 1 dB (1-sigma) that is difficult to compensate for. Fortunately, all contributing interference powers are equally affected by the scale factor error so when the rise over thermal is calculated, the scale factor error may be cancelled as $$RoT_{Digitalreceiver} = \frac{I_{tor,air}}{N_{Digitalreceiver}} \quad [8]$$

$$= \frac{scaleFactor \times I_{tot,antenna}}{scaleFactor \times N_{Antenna}}$$

$$= RoT_{Antenna}.$$

In order to understand the fundamental problem of neighbour cell interference when performing load estimation, note that $$I_{neighbor} + N = E[I_{Neighbor}(t)] + E[N] + \Delta I_{Neighbor} + \Delta N, \quad [9]$$

where E[ ] denotes mathematical expectation and where Δ denotes the variation around the mean. The fundamental problem may now be clearly seen. Since there are no measurements available in the network node that are related to the neighbour cell interference, a linear filtering operation may at best estimate the sum $E[I_{Neighbor}] + E[N]$. This estimate cannot be used to deduce the value of E[N]. The situation is the same as when the sum of two numbers is available. Then there is no way to figure out the values of the individual numbers. This issue is analyzed rigorously for the rise over thermal estimation problem in equation [2] where it is proved that the noise power floor is not mathematically observable.

The rise over thermal estimation algorithm is depicted in FIG. 1B. It is described in detail in [3]. The main problem solved by the estimation algorithm may be the accurate estimation of the thermal noise floor N. Since it is not possible to obtain exact estimates of this quantity due to the neighbour cell interference, the estimator therefore applies an approximation, by consideration of the soft minimum as computed over a relative long window in time.

It is important to understand that this estimation relies on the fact that the noise floor is constant over very long periods of time, disregarding the small temperature drift.

The sliding window algorithm of the above section has the disadvantage of requiring a large amount of storage memory. This becomes particularly troublesome in case a large number of instances of the algorithm are needed, as may be the case when Interference Cancellation (IC) is introduced in the uplink.

Interference cancellation approaches for HSUPA, e.g., [5] [6], are attractive for the purposes of achieving higher and higher uplink data rates. Typically, some form of iterative processing is employed in a multi-stage architecture. In each successive stage, interference is cancelled leading to improved detection of the desired signal(s). One such architecture for HSUPA is illustrated in FIG. 1C. In this exemplary architecture, the data channel for users 1 and 2 (E-DPDCH) is detected in a multi-stage fashion. These user equipments are referred to as the Multi-User Detection (MUD) user equipments.

The control channels for both the MUD user equipments and non-MUD user equipments (DPCCH, E-DPCCH, HS-DPCCH) are cancelled in various stages depending on when the control information is needed. For example, in order to detect the data channel, the E-DPCCH needs to be decoded, thus it is detected and cancelled in the first stage. The HS-DPCCH is detected, decoded, and cancelled in the second stage, since the information it carries is not critical to detecting the data channel. Delaying this channel to the second stage allows it to benefit from cancellation in the second stage. Similarly, the Physical Random Access Channel (PRACH) is detected in a later stage (e.g., stage-2, FIG. 1C) to allow it to benefit from interference cancellation (more on this below).

Note that only after the first stage will any signal benefit from the cancellation of other signals since the signals in the first stage are detected in parallel in the presence of the maximum level of interference. The block diagram shows the interference cancellation taking place in an "Antenna Buffer" indicated by the "Ant Buf" blocks. As such, the antenna buffer after each stage contains a "cleaned up" version of the original received signal. It is cleaned up in the sense that interference is cancelled.

As mentioned above, the PRACH is not detected until a later stage (e.g., stage-2 in FIG. 1C) to allow it to benefit from interference cancellation in earlier stages. Ideally, one would like to delay the detection of this signal as much as possible to maximize the benefit from interference cancellation; however, there is a limit due to the timing constraints on this channel set by the standard. There is a delay budget between the time the Random Access Channel (RACH) preamble is signalled by the user equipment and the time the user equipment received back an acquisition indicator (AICH) message indicating successful RACH detection. For this reason, the RACH detection is placed in stage-2.

The Random Access Channel is a shared channel that is used by user equipments in the cell e.g. for initial access to the network, without being scheduled.

FIG. 1C which may be a suitable trade-off between the interference cancellation benefit and the timing constraints. If the interference cancellation processing is very fast, then the RACH detection could be delayed further, thus increasing the benefit from interference cancellation without violating the timing constraints.

With interference cancellation between user equipments, to reach the Signal to Interference and Noise Ratio (SINR) target for a certain transport format, the required transmit power of a user may be reduced driven by the power control function. As a consequence, the load in the cell may be reduced, and more scheduling headroom may be left for the E-DCH traffic. Therefore, the cell throughput is expected to increase with interference cancellation.

Furthermore, further throughput gain could be expected from increasing the allowed cell load considering that the interference as experienced by the user equipment is no longer the total received air interface power at the Node B. The stability may be much better controlled with interference cancellation so that the load limit considering stability could be further released. Therefore, the cell load may be controlled based on the user experienced load after interference cancellation processing.

FIG. 1D illustrates the general principles of an interference cancellation process. When the transmission of a user equipment has been detected, or even decoded, the so obtained signal may be used to re-generate a model signal, a replica signal, that resembles the effect of the original transmitted signal of the user equipment e.g. at the antenna or at another point in the receiver chain. The creation of the signal always requires that the channel model is available, to capture the effect of the radio transmission from the user equipment to the base station. The model signal may then be subtracted from the received broadband signal. In case the model signal is accurate, then the effect of the user equipment on the uplink may be reduced. Since this signal is only interference for the other user equipment, the effect of the subtraction is that interference as seen by the user equipment is cancelled, hence the acronym interference cancellation.

Interference cancellation exists in several variants. As indicated above interference cancellation may be based on demodulated IQ samples. Another option is to base the cancellation on decoded symbols. The latter option has the advantage of a better performance since the coding gain is exploited to enhance the quality of the model signal. On the other hand the delay is increased, due to the time needed for the decoding step. An additional delay is a consequence of most practical interference cancellation variants, since a model signal may need to be created before cancellation may be performed.

Another distinction of interference cancellation algorithms may be between soft and hard algorithms.

Today, much of the discussion on how to implement interference cancellation is focused on the different architectures, described in the following sub-sections. This is because interference cancellation may in general be computationally complex and also cause a time delay, which may be somewhat different for different interference cancellation architectures, as e.g. the ones illustrated in FIG. 1E and FIG. 1F.

FIG. 1E illustrates a structure of Successive Interference Cancellation (SIC). The block diagram is shown for detected signals. As may be seen in FIG. 1E, the detected signal of the first user equipment is immediately used to improve the conditions for all other user equipments, then the detected signal of the second user equipment is used to improve the conditions for all other user equipments but the first user equipment, and so on. This means that interference cancellation gains are achieved already at stage 1, however the delay of each stage will be dependent on the detection time of each user equipment. The delay may hence depend on the number of (interference cancellation) user equipments.

FIG. 1F illustrates the principles of Parallel Interference Cancellation (PIC). In parallel interference cancellation interference subtraction is only performed between stages. The consequence is that the number of units for regeneration and subtraction become large. The delay is however fix, a fact that simplifies system design.

The previously known solutions further increase the cell load mainly based on the fact that with interference cancellation the stability between user equipments is improved. For a multi-stage interference cancellation process, the interference cancellation gain after the final interference cancellation stage is captured. This is proper with for example the clean-carrier case, which means no new user equipment will connect to this carrier. However, for a normal case, the coverage limit for load control needs to be handled as well.

For a multi-stage interference cancellation process, the channel that limits the cell coverage (e.g. PRACH) may not be able to get the full interference cancellation gain at the final interference cancellation stage. For example, considering the delay that may be tolerated, the PRACH may have to be detected at some intermediate interference cancellation stage rather than at the final stage, and if the load is controlled based on the final interference cancellation stage, there will be a coverage problem. However, there are no algorithms or concepts known in prior art that are able to address the load experience after said some intermediate interference cancellation stage rather than the final interference cancellation stage. Moreover, prior art always controls the load based on interference cancellation gain estimated at a fixed interference cancellation stage (e.g. the final stage), and this may either overestimate or underestimate the available coverage budget.

Furthermore, known solutions estimate interference cancellation gains only based on the total wideband received power before and after interference cancellation, which is inaccurate especially in a multi-cell cases, where there exists inter-cell interference. Moreover, different channels of a user equipment may experience different interference cancellation gain (e.g. the control channel may have less interference cancellation gain due to different handling scheme), this is currently not considered.

SUMMARY

It is therefore an object of the present methods and devices to obviate at least some of the above disadvantages and provide an improved performance in a wireless communication system.

According to a first aspect, the object is achieved by a method in a network node. The method aims at performing load control in a cell in a wireless communication system. The method comprises starting an interference cancellation process, for reducing interference between uplink signals. Further, the method comprises estimating an interference cancellation gain, relative to an interference reduced received uplink signal power resulting from the interference cancellation process, wherein the interference cancellation gain is estimated after the start of the interference cancellation process but before the interference cancellation process is completed. In addition the method comprises controlling the traffic load of the cell, by considering the estimated interference cancellation gain.

According to a second aspect, the object is achieved by a network node for load control in a cell in a wireless communication system. The network node comprises a processing circuitry configured to start an interference cancellation process, for reducing interference between the uplink signals. The processing circuitry is also configured to estimate an interference cancellation gain relative to an interference reduced received uplink signal power resulting from the interference cancellation process, wherein the interference cancellation gain is estimated after the start of the interference cancellation process but before the interference cancellation process is completed. In addition, the processing circuitry is furthermore configured to control the traffic load of the cell, by considering the estimated interference cancellation gain.

The advantages of the methods and network nodes disclosed herein, referring to embodiments described herein comprises increased performance i.e. throughput, by allowing scheduling of resources made available by the interference cancellation gains. Also, embodiments described herein provide means for simultaneous maintenance and control of coverage and stability limits, governed by other constraints such as RACH preamble detection. Further, embodiments herein provide a solution to the problem of too long delay associated with interference cancellation.

Other objects, advantages and novel features of the embodiments disclosed herein will become apparent from the following detailed description.

BRIEF DESCRIPTION OF THE DRAWINGS

The embodiments are described in more detail with reference to attached drawings illustrating some examples of embodiments, and in which.

DETAILED DESCRIPTION

Embodiments herein are defined as a network node and a method in a network node, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Figure 1A:
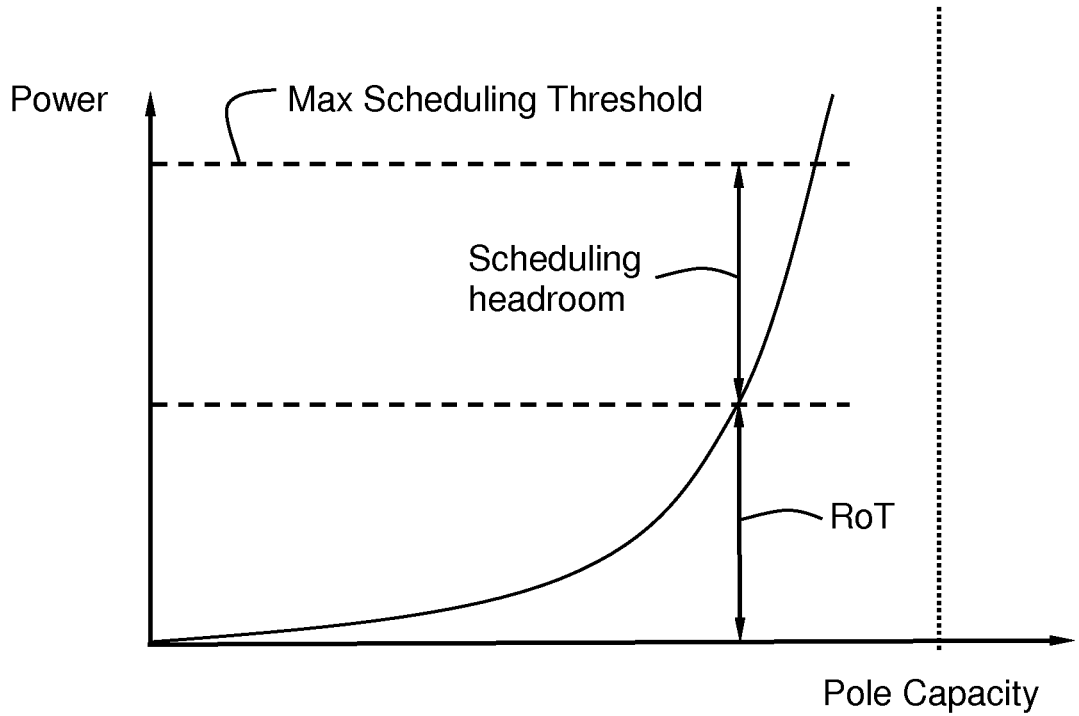
FIG. 1A is a block diagram illustrating power usage in a cell according to prior art.
Figure 1B:
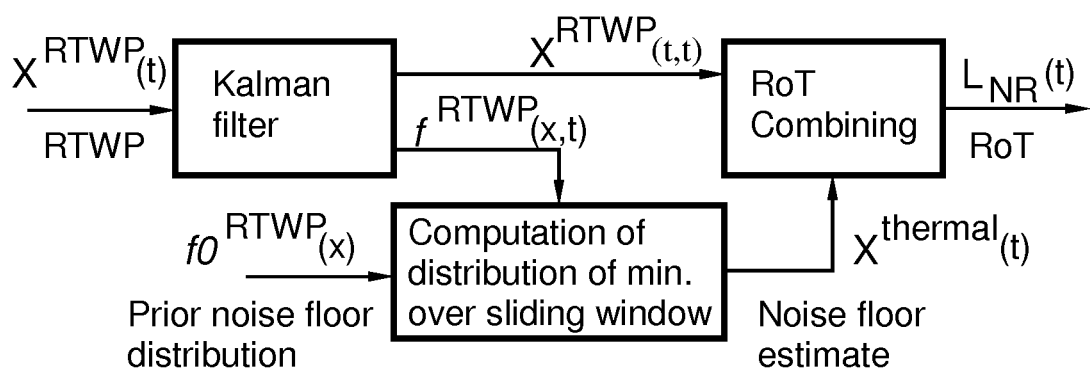
FIG. 1B is a block diagram illustrating the Rise over Thermal estimation algorithm, according to prior art.
Figure 1C:
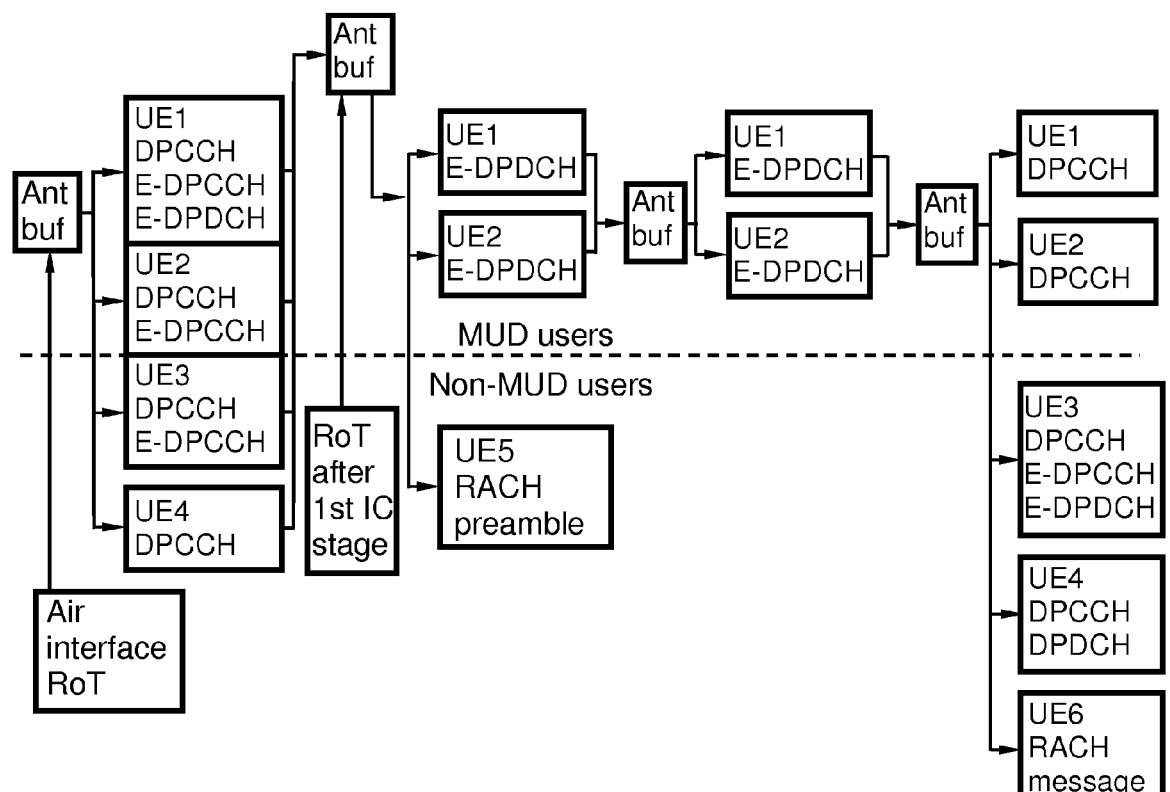
FIG. 1C is a block diagram illustrating an example of channel handling in a multi-stage interference cancellation receiver architecture, according to prior art.
Figure 1D:
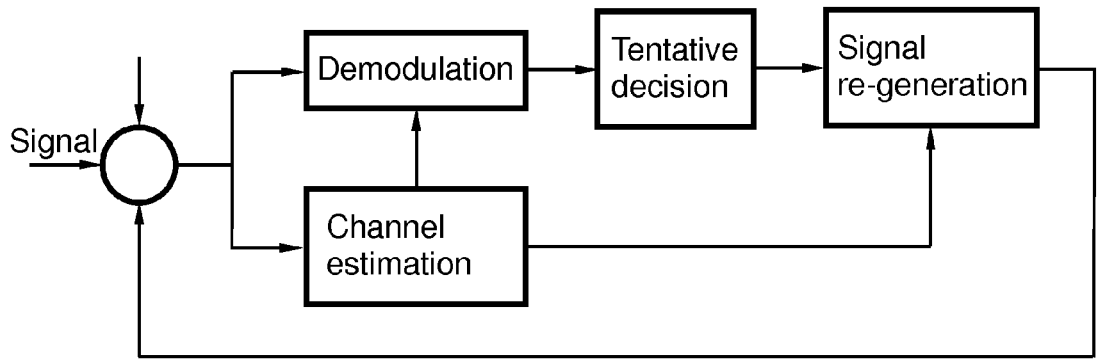
FIG. 1D is a block diagram illustrating the basic interference cancellation principle according to prior art.
Figure 1E:
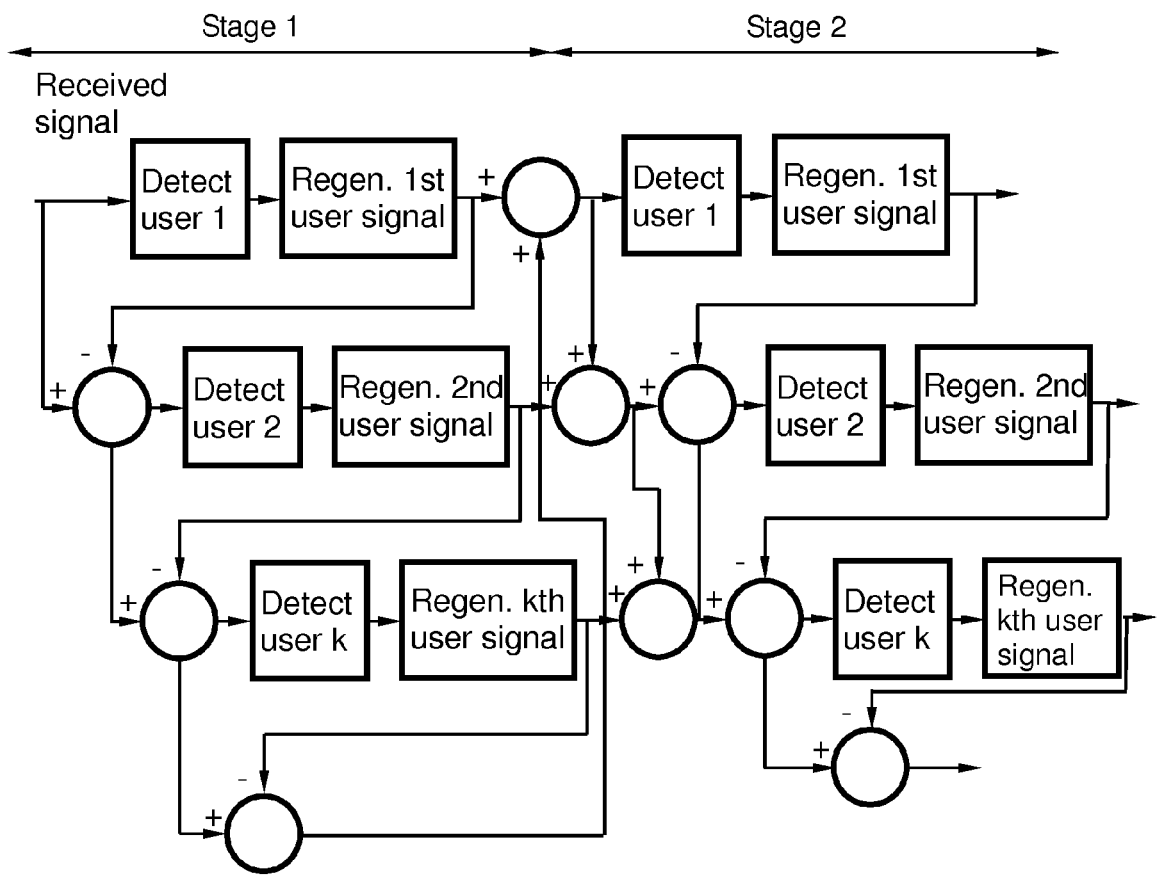
FIG. 1E is a block diagram illustrating successive interference cancellation according to prior art.
Figure 1F:
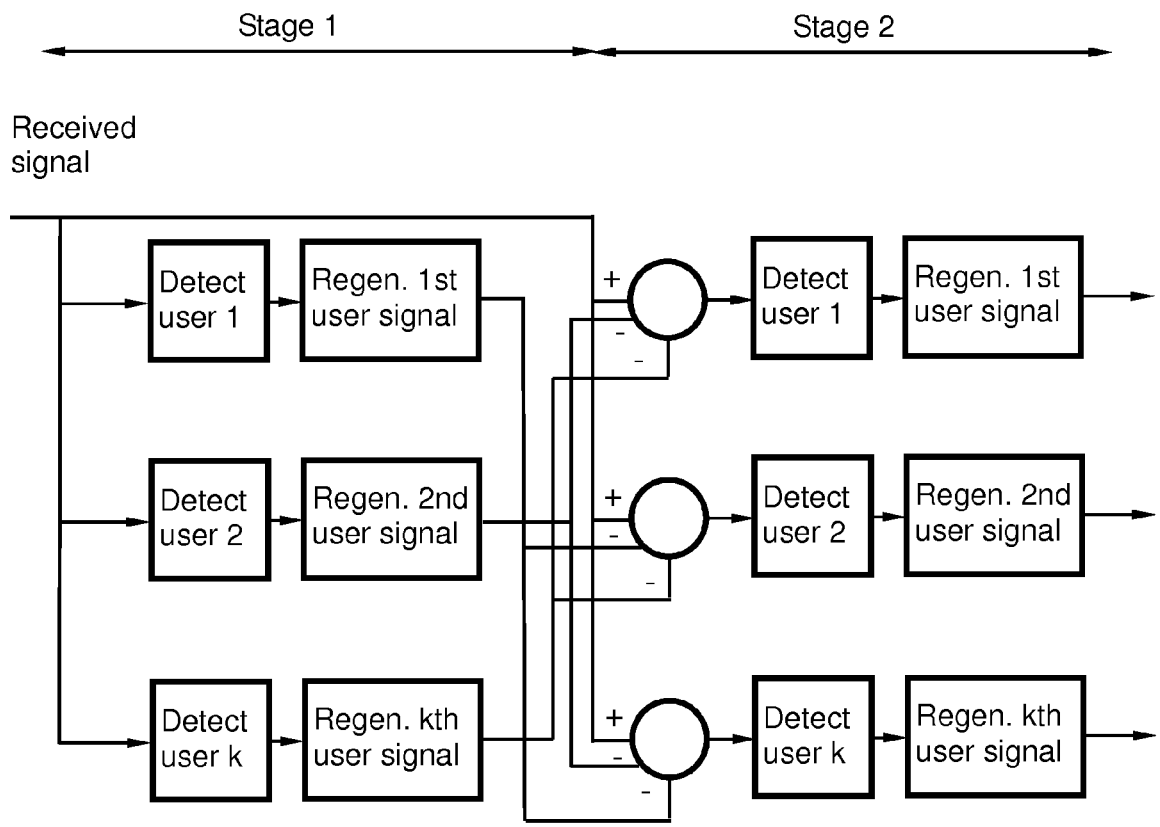
FIG. 1F is a block diagram illustrating parallel interference cancellation according to prior art.
Figure 2:
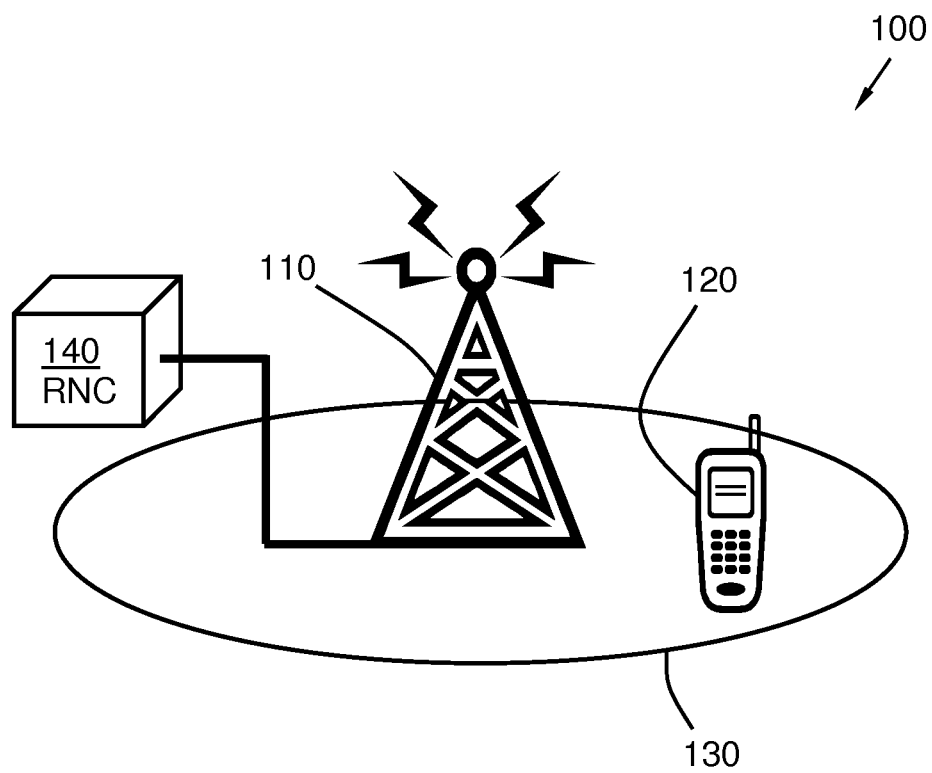
FIG. 2 is a schematic block diagram illustrating a wireless communication system according to some embodiments.

FIG. 2 depicts a wireless communication system 100, such as e.g. 3rd Generation Partnership Project (3GPP) Wideband Code Division Multiple Access (WCDMA), Long Term Evolution (LTE), LTE-Advanced, Evolved Universal Terrestrial Radio Access Network (E-UTRAN), Universal Mobile Telecommunications System (UMTS), Global System for Mobile communications/Enhanced Data rate for GSM Evolution (GSM/EDGE), Code-Division-Multiple-Access (CDMA) network, Worldwide Interoperability for Microwave Access (WiMax), or Ultra Mobile Broadband (UMB), just to mention some few non-limiting options.

In the following, the embodiments of the disclosed method, wireless communication system 100 and network nodes comprised therein are further elaborated with specific reference to WCDMA systems. Thus the wireless communication system 100 is described as a WCDMA system throughout the rest of the description, for enhanced comprehension and readability. However, it is obvious to a skilled person that corresponding concepts may also be applied in other wireless communication systems 100, using other radio access technologies, in particular to systems employing Code Division Multiple Access (CDMA).

The wireless communication system 100 comprises a network node 110 and a user equipment 120 situated in a cell 130. The network node 110 and the user equipment 120 are configured to communicate wirelessly with each other over a radio interface. The network node 110 is connected to a control unit 140.

A plurality of user equipments 120 may be present simultaneously in the same cell 130, but for clarity reasons, only one user equipment 120 is depicted in FIG. 2. These, user equipments 120 may under certain circumstances interfere with each other, why power control may be applied to adjust the transmission power of the user equipment 120.

Uplink radio signals may be sent from the user equipments 120 over a radio link and are received by the network node 110. The power of the signal, which may be too high or too low to be suitable for the network node 110, is adjustable by the network node 110. Such adjustment of the power of a signal received from the user equipment 120 may in some embodiments be performed partly in the radio network controller 140 and partly in the network node 110. In some embodiments may such adjustment of the power of a signal received from the user equipment 120 be performed entirely in the radio network controller 140.

The purpose of the illustration in FIG. 2 is to provide a general overview of the environment in which the present methods are intended to operate.

The network node 110 may be referred to as e.g. a base station, a Node B, an evolved Node B (eNB, or eNode B), a base transceiver station, Access Point Base Station, base station router, or any other network node configured for communication with the user equipment 120 over a wireless interface, depending e.g. of the radio access technology and terminology used. In the rest of the description, the term "network node" will be used for the network node 110, in order to facilitate the comprehension of the present methods and embodiments.

The user equipment 120 may be represented by e.g. a wireless communication terminal, a mobile cellular phone, a Personal Digital Assistant (PDA), a wireless platform, a laptop, a computer or any other kind of device capable to communicate wirelessly with the network node 110.

The network node 110 is connected to the control unit 140. The control unit 140 may be e.g. a Radio Network Controller (RNC). The control unit 140 is a governing element in the wireless communication network 100, responsible for control of network nodes 110, which are connected to the control unit 140. The control unit 140 may carry out radio resource management and e.g. some of the mobility management functions, according to some embodiments. The control unit 140 is in FIG. 2 depicted as separated from the network node 110. However, it is possible to imagine embodiments wherein the control unit 140 is a unit physically integrated within the network node 110, according to some embodiments.

The network node 110 controls at least some radio resource management within the cell 130, such as e.g. allocating radio resources to user equipment 120 within the cell 130 and ensuring reliable wireless communication links between the network node 110 and the user equipment 120 e.g. by means of power control of the power of the signals emitted by the user equipment 120. The power control may be performed by running an inner power control loop and an outer power control loop.

However, the network node 110 is also, as previously discussed, scheduling user equipment 120 within the cell 130. In order to perform the scheduling, a prediction of the uplink load within the cell 130 is made in the network node 110, by running a load prediction algorithm, as previously explained.

The herein presented embodiments disclose solutions for HSUPA load control which may further increase the cell throughput and at the same time keep the coverage limit. The interference cancellation gain after some intermediate interference cancellation stage is captured and converted to the allowed cell load. The intermediate interference cancellation stage depends on for example when the PRACH preamble is detected. Corresponding algorithms for rise over thermal target setting and load factor estimation as well as load to E-TFC mapping are presented.

It may be assumed a scenario wherein user equipments 120 within the cell 130 are transmitting on DPCCH and on E-DPDCH. For the sake of simplicity it is assumed that the received powers due to the E-DPCCH control channels are negligible.

Let $P_{ci}$ and $P_{di}$ be the received DPCCH and E-DPDCH powers for the i-th user equipment 120, respectively. Let $I_{other}$ and N represent the received other-cell interference power (i.e. the additional interference caused by user equipment situated in other cells than the own cell 130) and thermal noise power, respectively.

Let $\epsilon_{ci}$ and $\epsilon_{di}$ be the Residual Interference Fractions (RIF) after interference cancellation for the DPCCH and E-DPDCH of the i-th user equipment 120, respectively. The residual interference fraction may be defined to be $$\epsilon_i = 1 - \eta_i, \qquad [10]$$

where $$\eta_i = 1 - \frac{P_{residual}}{P} \qquad [11]$$

is the cancellation efficiency. P is the power of a particular signal before cancellation and $P_{residual}$ is the residual power after cancellation.

Note that the RIF depends on the interference cancellation stage, or in other words, for each antenna buffer after each interference cancellation stage in FIG. 2, the RIF for each channel may be different.

Before interference cancellation, the total received power is $$I_{total,air} = \Sigma(P_{ci} + P_{di}) + I_{other} + N, \qquad [12]$$

and the associated rise over thermal at the air interface is $$RoT_{air} = \frac{I_{total,air}}{N}. \qquad [13]$$

After the interference cancellation, the total residual signal power in the antenna buffer is $$I_{total,eff} = \Sigma(\epsilon_{ci} P_{ci} + \epsilon_{di} P_{di}) + I_{other} + N. \qquad [14]$$

Note that $\epsilon_{ci}$ or $\epsilon_{di}$ could be unity which meaning that user or channel is not cancelled in the interference cancellation process. The associated (effective) rise over thermal is $$RoT_{eff} = \frac{I_{total,eff}}{N}. \qquad [15]$$

Note that the total residual signal power $I_{total,eff}$ depends on the interference cancellation stage too. Theoretically, the total residual signal power after the final interference cancellation stage may be smaller than the total residual signal power after the first interference cancellation stage. A cell-wide cancellation efficiency may be defined as $$\eta_{cell} = 1 - \frac{I_{total,eff}}{I_{total,air}} = 1 - \frac{RoT_{eff}}{RoT_{air}}. \qquad [16]$$

Hence the cell-wide interference cancellation gain is given by $$G_{cell,IC} = 10\log_{10}\frac{RoT_{air}}{RoT_{eff}}. \quad [17]$$

This quantity reflects how much own-cell interference is cancelled in the interference cancellation aggregated over all user equipments 120.

As previously described, the PRACH preamble is detected based on the antenna buffer after some intermediate interference cancellation stages considering the delay requirements, for example, the $1^{st}$ interference cancellation stage. In the antenna buffer, the E-DPDCH power of the MUD users and the DPCCH power for all the user equipments 120 in the cell 130 have been cancelled according to the respective cancellation efficiency of the first interference cancellation stage. Therefore, when a user equipment 120 tries to access to the cell 130 with PRACH preamble, the experienced interference is not the total interference in the antenna buffer before interference cancellation, but the interference measured in the antenna buffer after interference cancellation (first stage).

It is to be noted that although the expression "first stage" is used herein as an example, different embodiments of the present method may instead utilise any other intermediate stage of the interference cancellation, but not exactly the first stage. Thus, whenever reference is made to the first stage of the interference cancellation, any other intermediate stage of the interference cancellation may be used instead, in different embodiments.

For the other channels rather than the PRACH preamble, the final decoding of these channels is after the final interference cancellation stage, which means they may get the benefit from all the interference cancellation stages. However, considering the coverage perspective, the load control in the cell 130 may take the PRACH preamble interference cancellation capability as the control basis.

Therefore, several load control alternatives are proposed and described in the following sections which try to further capture the system level gain from interference cancellation by increasing the air interface rise over thermal and at the same time still keep the coverage not damaged.

In an embodiment, the load control is based on the received signals in the antenna buffer before interference cancellation. The load control target is set for the air-interface rise over thermal. But considering the interference cancellation benefit for the PRACH preamble, as long as the residual interference after the first interference cancellation stage is kept below the normal rise over thermal target, the decoding of the PRACH preamble is not a problem. Therefore, the air interface rise over thermal target may be increased.

Suppose the air interface rise over thermal target without interference cancellation to be $RoT_{target\_withoutIC}$, then the air interface rise over thermal target may be increased to $RoT_{target\_air\_IC}$ when there is interference cancellation deployed in the cell 130

$$(RoT_{target\_air\_IC})_{dB} = (RoT_{target\_withoutIC})_{dB} + G_{cell,IC}, \quad [18]$$

where $G_{cell,IC}$ is the cell-level interference cancellation gain which may be estimated in different ways.

Embodiment 1

Instantaneous Interference Cancellation Gain

In this firstly described embodiment, the interference cancellation gain may be estimated according to equation [17], but the effective rise over thermal in equation [17] is the effective rise over thermal measured after the intermediate interference cancellation stage rather than the final interference cancellation stage.

Embodiment 2

Statistical Interference Cancellation Gain Via a Self-Learning Procedure

In this secondly described embodiment, an adaptive learning algorithm is used to estimate the interference cancellation gain. This embodiment may be further subdivided into four steps 1-4.

Step 1, the instantaneous interference cancellation gain after the first interference cancellation stage is measured. However, in different alternative embodiments, the instantaneous interference cancellation gain may be measured after any other intermediate interference cancellation stage.

Step 2, comprises repeating step 1 over a long time period and over many user equipments 120 to build up a Cumulative Distribution Function (CDF) of the interference cancellation gain.

Step 3, a percentile is extracted from the generated CDF, the statistical interference cancellation gain is x dB.

Step 4, the air interface rise over thermal target is updated according to equation [18], and $G_{IC}$ is x dB.

In a further embodiment, the load control function is moved from the antenna buffer before interference cancellation to the antenna buffer after the first interference cancellation stage. This means that instead of the air interface rise over thermal, the effective rise over thermal after the first interference cancellation stage is controlled to be below a target.

The target of the effective rise over thermal may be set the same as the normal air interface rise over thermal target without interference cancellation. For example, if the rise over thermal target for a cell is 10 dB in the normal case, when interference cancellation is deployed, in order to keep the coverage, the target of the effective rise over thermal after the first interference cancellation stage may also be set to 10 dB.

As previously described, in order to calculate the allowed scheduling headroom, and further on to estimate the granted E-TFCs, the load factor for each channel needs to be calculated. After the intermediate interference cancellation stage (for example the first interference cancellation stage), the DPCCH load factor is $$L_{ci} = \varepsilon_{IC}\frac{P_{ci}}{I_{total,eff}}, \quad [19]$$

where $\varepsilon_{IC} = 10^{-G_{cell,IC}/10}$ is a scaling factor that may be estimated in different ways.

In a further embodiment, load factor scaling with statistical interference cancellation gain is performed.

Within such embodiment, $\varepsilon_{IC}$ is estimated by the statistical method previously described. Either the average interference cancellation gain or some percentile of the interference cancellation gain CDF may be used.

In yet a further embodiment, load factor scaling with instantaneous interference cancellation gain may be made. Cell-level instantaneous interference cancellation gain, given by $$\varepsilon_{IC} = \frac{I_{tot,eff} - I_{other} - N}{I_{tot,air} - I_{other} - N}, \quad [20]$$

or $$\varepsilon_{IC} = \frac{I_{tot,eff}}{I_{tot,air}}. \quad [21]$$

Equation [20] may be more accurate since the interference cancellation only takes effect for the intra-cell interference. However, equation [21] may be simpler.

A further embodiment comprises channel specific interference cancellation gain. The DPCCH load factor is given by $$L_{ci} = \frac{\varepsilon_{ci} P_{ci}}{I_{total,eff}}, \quad [22]$$

where $\varepsilon_{ci}$ is the Residual Interference Fractions (RIF) after interference cancellation for the DPCCH of the i-th user as previously described. The E-DPDCH load factor for a MUD user is given by $$L_{di,MUD} = \frac{\varepsilon_{di,MUD} P_{di,MUD}}{I_{total,eff}} = \frac{\varepsilon_{di,MUD} \beta_{di,MUD} P_{ci,MUD}}{I_{total,eff}}, \quad [23]$$

where $\varepsilon_{di,MUD}$ is the residual interference fraction after interference cancellation for the E-DPDCH of the i-th user (MUD user) and $\beta_{di,MUD}$ is the E-DPDCH to DPCCH power offset for the i-th MUD user.

The E-DPDCH load factor for the non-MUD users is given by $$L_{di,nonMUD} = \frac{P_{di,nonMUD}}{I_{total,eff}} = \frac{\beta_{di,nonMUD} P_{ci,nonMUD}}{I_{total,eff}}. \quad [24]$$

Notice that the load factor is not scaled by the RIF since the E-DPDCH signal for non-MUD users are not cancelled in the first stage of interference cancellation. The estimated load factors are the basis for the load to E-TFC mapping in the scheduler to estimate the granted E-TFCs.

In the load-to-EFTCI mapping process the scheduler measures the DPCCH load and predicts the E-DPDCH load from this. The goal is to choose the power offset to fill up the available load headroom. Today, without interference cancellation, this prediction is done simply by multiplying the DPCCH load by the power offset to obtain the E-DPDCH load. Here the beta factor defining the offset is $$\beta_{di} = \frac{Load_{avail}}{L_{ci}}. \quad [25]$$

However, with interference cancellation, if the E-DPDCH load factor is expressed in terms of the DPCCH load factor for the MUD users.

$$L_{di,MUD} = \beta_{di,MUD} \left( \frac{\varepsilon_{di,MUD}}{\varepsilon_{ci,MUD}} \right) L_{ci,MUD} \quad [26]$$

For the non-MUD user:

$$L_{di,nonMUD} = \beta_{di,nonMUD} \left( \frac{1}{\varepsilon_{ci,nonMUD}} \right) L_{ci,nonMUD}. \quad [27]$$

One may see from equations [26] and [27], that the E-DPDCH load depends not only on the DPCCH load and power offset, but also on the RIF factors. Therefore, the power offset may be estimated by $$\beta_{di} = \frac{Load_{avail}}{L_{ci}} \left( \frac{\varepsilon_{ci}}{\varepsilon_{di}} \right). \quad [28]$$

For MUD users, for simplicity, one may ignore the fact that the E-DPDCH and DPCCH RIF factors might be different and use the conventional mapping approach given by equation [25]. However, in practice, one would expect the RIF factors to be different for at least at two reasons:

i) Typically the DPCCH is cancelled in the first stage and the E-DPDCH undergoes multiple stages of cancellation.

ii) The DPCCH is cancelled based on hard decisions on the DPCCH data. In contrast, the E-DPDCH is cancelled based on soft symbol values that reflect the quality of the decoded E-DPDCH bits.

In contrast to the MUD users, the non-MUD users' E-DPDCHs are not cancelled in the first stage. It may not be assumed that the E-DPDCH and DPCCH RIF factors are the same. Therefore, for non-MUD users, the power offset may be estimated as $$\beta_{di,nonMUD} = \frac{Load_{avail}}{L_{ci,nonMUD}} \varepsilon_{ci,nonMUD}. \quad [29]$$

Besides the channel specific RFI $\varepsilon_{ci,nonMUD}$, the instantaneous cell specific scaling factor computed e.g. by equations [20] or [21] may be utilised as previously described. Alternatively some average measure of the cell-wide interference cancellation gain obtained from the distribution (CDF) of $G_{cell,IC}$ may be used. For example, one may use $\varepsilon_{cell} = 10^{-\overline{G}/10}$ where $\overline{G}$ is the mean interference cancellation gain. Alternatively some percentile of the CDF may be used, e.g., the tenth percentile for a conservative scheduling.

In summary, four load control/load estimation embodiments are proposed, see Table 1.

However, it may be noted that some, or all of the described embodiments may be combined, entirely or partially.

Embodiment 1

The interference cancellation gain is captured by increasing the air interface rise over thermal target by x dB where x is determined by capturing long term statistics on the difference between the air interface rise over thermal and the rise over thermal after some intermediate stage of interference cancellation.

Embodiment 2

The interference cancellation gain is captured by increasing the air interface rise over thermal target by x dB where x is determined by capturing the instantaneous interference cancellation gain after an intermediate stage of interference cancellation.

Embodiment 3

The load control is moved from the antenna buffer before interference cancellation to the antenna buffer after interference cancellation (first stage). Thus, rise over thermal is measured and controlled after a single stage of interference cancellation. The rise over thermal target is left as it is today. The load factor of each channel as well as the load to transport format mapping is calculated by scaling with the interference cancellation gain.

Embodiment 4

This embodiment is similar to embodiment 3, but the statistical interference cancellation gain for power scaling is used when the rise over thermal is controlled after an intermediate stage of interference cancellation.

TABLE 1

| | Stage to do load control | | Method to estimate IC gain | | RoT target (compared to w/o. IC) | | Load factor scaling with IC gain | |
|---|---|---|---|---|---|---|---|---|
| | Before IC | After 1$^{st}$ IC stage | statistical | instantaneous | Increase x dB depends on IC gain | Same | yes | no |
| Alt-1 | √ | | √ | | √ | | | √ |
| Alt-2 | √ | | | √ | √ | | | √ |
| Alt-3 | | √ | | √ | | √ | √ | |
| Alt-4 | | √ | √ | | | √ | √ | |

In some cases, it is possible to control the cell load based on the interference cancellation gain estimated with a dynamic interference cancellation stage. One example comprises multi-carrier, and one or more clean carrier(s) based on e.g. the selected traffic load. For the so-called clean carrier, where no new user equipment 120 will connect to the carrier, the interference cancellation gain of the final interference cancellation stage is of interests to be captured in load control, while for the other carrier(s) which need to ensure normal access for the potential new user equipments 120, the interference cancellation gain of the intermediate interference cancellation stage may be captured in the load control. Depending on whether a carrier is configured as a "clean carrier", based on e.g. the concurrent traffic situation, the interference cancellation gain estimation for each carrier is dynamically changed depending on the channel handling strategy with interference cancellation.

Further, the herein described embodiments are applicable both to a sliding window Rise over Thermal estimation algorithm and a recursive algorithm, for reducing the memory requirements of the sliding window scheme.

Figure 3:
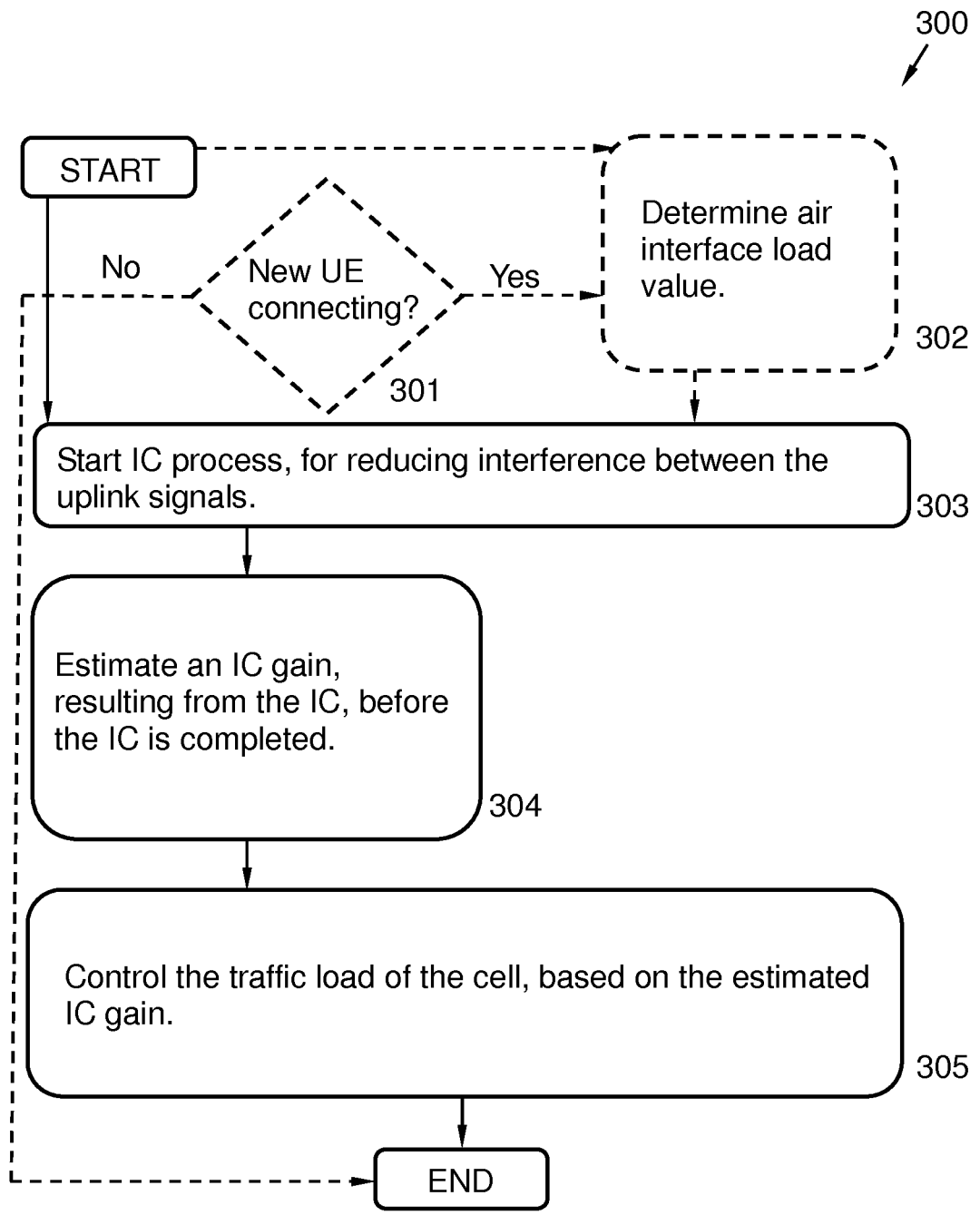
FIG. 3 is a flow chart illustrating an embodiment of the present method.

FIG. 3 is a flow chart illustrating embodiments of a method 300 that comprises a number of actions 301-305 performed in a network node 110. The method 300 aims at providing load control in a cell 130 in a wireless communication system 100. The cell 130 comprises at least one user equipment 120. The network node 110 and the user equipment 120 are comprised in the wireless communication system 100 which is typically a WCDMA radio network. The network node 110 may be e.g. a base station/node B, according to some embodiments.

The herein discussed air interface load target value and load target value, may be rise over thermal target values. The air interface load value and load value, may be rise over thermal values. The rise over thermal values may be determined by measuring the total received uplink signal power of uplink signals divided by an estimated noise floor power value.

The interference cancellation gain may be estimated by taking out the inter-cell interference and estimated noise floor power from the total interference in some embodiment.

To appropriately provide load control in a cell 130 in a wireless communication system 100, the method 300 may comprise a number of actions 301-305.

It is however to be noted that some of the described actions are optional and only comprised within some embodiments. Further, it is to be noted that the actions 301-305 may be performed in a somewhat different chronological order and that some of them, e.g. action 301 and/or action 302, are optional and may be performed according to some alternative embodiments. In addition, any, some or all of the actions 301-305 may be performed simultaneously or in a somewhat rearranged chronological order. The method 300 may comprise the following actions:

Action 301

This action is optional and may be performed within some alternative embodiments.

It is determined if any new user equipment 120 will connect to a carrier for which the interference cancellation process is performed, according to some embodiments.

Further, if it is, at least some of the actions 302-305 are performed. Otherwise, if it is determined that no new user equipment 120 will connect to the carrier, the interference cancellation gain of the final interference cancellation stage is utilised instead.

Action 302

This action is optional and may be performed within some alternative embodiments.

An air interface load value is determined. The air interface load value is typically relative to a total received uplink signal power of uplink signals, before the interference cancellation process is started.

Action 303

An interference cancellation process is started, for reducing interference between uplink signals.

The interference cancellation process may be an iterative process performed in multiple stages. Further, according to some embodiments, at least some of the actions of: estimating 304 the interference cancellation gain and/or controlling 305 the traffic load of the cell 130 may be performed after an intermediate interference cancellation stage but before the interference cancellation process is completed.

Action 304

An interference cancellation gain is estimated. The interference cancellation gain is relative to an interference reduced received uplink signal power resulting from the interference cancellation process. The interference cancellation gain is estimated after the start 303 of the interference cancellation process but before the interference cancellation process is completed.

According to some embodiments, the estimation of the interference cancellation gain may comprise measuring an interference reduced received total uplink signal power value in an interference cancelling receiver, dividing it with a value of an estimated noise floor power, thereby acquiring an interference reduced load value and determining the difference between the determined 302 air interface load value and the interference reduced load value.

Further, according to some embodiments, the estimation of the interference cancellation gain is based on collected statistics over a period of time on differences between the respective air interface load value, and interference reduced load value, as experienced by a plurality of user equipments 120.

In addition, according to some embodiments, the estimation of the interference cancellation gain comprises comparing an air interface load target value with an interference reduced load value. The interference reduced load value is calculated by estimating an interference reduced received total uplink signal load value in an interference cancelling receiver, divided with an estimated noise floor power value. The interference reduced received total uplink signal load value and noise floor power value may be estimated after the start 303 of the interference cancellation process but before the interference cancellation process may be completed.

According to some embodiments, the interference reduced load value may be estimated by the further action of determining 302 an air interface load value, and scaling by a scaling factor, which scaling factor may be based on an instantaneous interference cancellation gain.

The scaling factor may be based on collecting statistics over a period of time, on differences between the respective air interface load value, and interference reduced load value, as experienced by a plurality of user equipment 120.

Action 305

The traffic load of the cell 130 is controlled, by considering the estimated 304 interference cancellation gain.

According to some embodiments, the traffic load of the cell 130 may be controlled 305 by adjusting an air interface load target value by addition of the estimated 304 interference cancellation gain.

Figure 4:
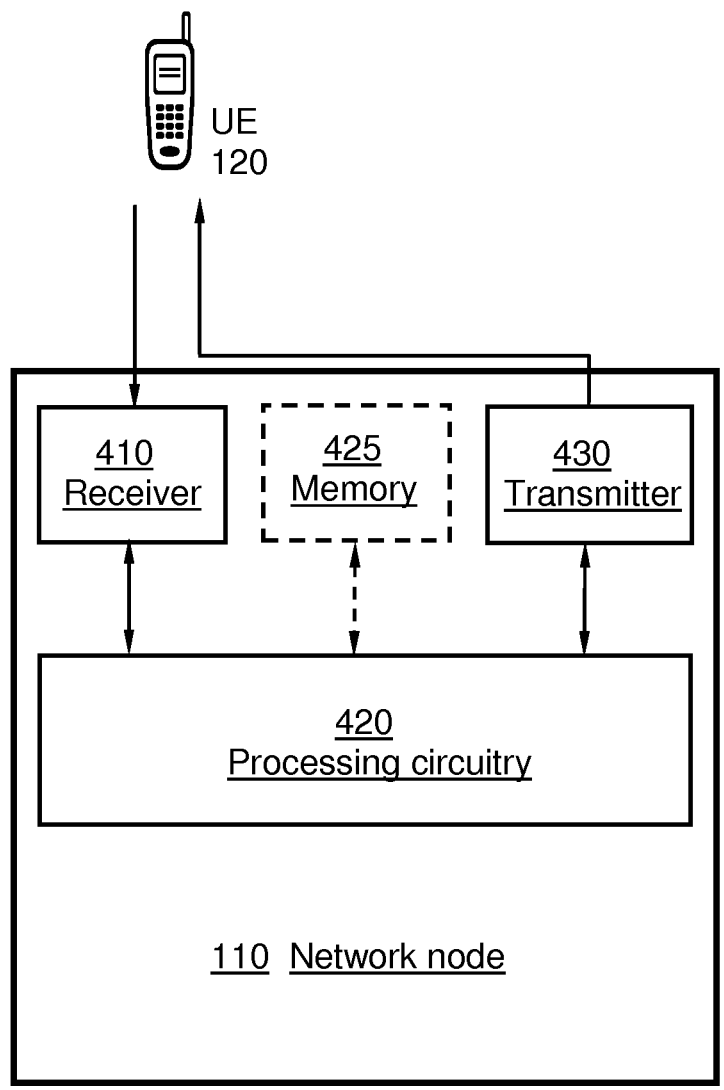
FIG. 4 is a block diagram illustrating embodiments of the present network node.

FIG. 4 schematically illustrates a network node 110 for load control in a cell 130 in a wireless communication system 100. The network node 110 is configured to perform any, some or all of the actions 301-305 in order to provide load control in a cell 130 in a wireless communication system 100. The cell 130 may comprise at least one user equipment 120.

The network node 110 and a control unit 140 may be comprised in the wireless communication system 100. The wireless communication system 100 may comprise e.g. a WCDMA radio network. The network node 110 may be e.g. a base station/node B, according to some embodiments.

The herein discussed air interface load target value and the load target value, respectively, may be rise over thermal target values. The air interface power value and power value, respectively, may be rise over thermal values. The rise over thermal value may be determined by measuring the total received uplink signal power of uplink signals divided by an estimated noise floor power value, according to some embodiments.

In order to perform the actions 301-305 correctly, the network node 110 comprises e.g. a processing circuitry 420, configured to start an interference cancellation process, for reducing interference between the uplink signals. Further, the processing circuitry 420 is configured to estimate an interference cancellation gain relative to an interference reduced received uplink signal power resulting from the interference cancellation process, wherein the interference cancellation gain is estimated after the start of the interference cancellation process but before the interference cancellation process is completed. In further addition, the processing circuitry 420 is further configured to control the traffic load of the cell 130, by considering the estimated interference cancellation gain.

The processing circuitry 420 may further be configured to determine an air interface power value, relative to a total received uplink signal power of uplink signals, before the interference cancellation process is started, according to some embodiments. Further, the processing circuitry 420 may in addition be configured to estimate the interference cancellation gain by measuring an interference reduced received total uplink signal power value in an interference cancelling receiver and dividing it with a value of an estimated noise floor power. Thereby, according to some embodiments, the processing circuitry 420 may acquire an interference reduced load value and determining the difference between the determined air interface load value and the interference reduced load value. Furthermore, the processing circuitry 420 may be configured to control the traffic load of the cell 130, by adjusting an air interface load target value by addition of the estimated interference cancellation gain, according to some embodiments.

The processing circuitry 420 may further be configured to estimate the interference cancellation gain based on collected statistics over a period of time on differences between the respective air interface load value, and interference reduced load value, as experienced by a plurality of user equipments 120. In further addition, the processing circuitry 420 may also be configured to control the traffic load of the cell 130, by adjusting an air interface load target value by addition of the estimated interference cancellation gain, according to some embodiments.

Further, the processing circuitry 420 may be configured to estimate the interference cancellation gain by comparing an air interface load value with an interference reduced load value. The interference reduced load value may be calculated by estimating an interference reduced received total uplink signal load value in an interference cancelling receiver, divided with an estimated noise floor power value. The interference reduced received total uplink signal load value and noise floor power value are estimated after the start of the interference cancellation process but before the interference cancellation process is completed.

Additionally, the processing circuitry 420 may in addition be further configured to estimate the interference reduced load value by determining an air interface load value, and scaling by a scaling factor, which scaling factor may be based on an instantaneous interference cancellation gain.

Furthermore, the processing circuitry 420 may further be configured to determine a scaling factor, by collecting statistics over a period of time, on differences between the respective air interface load value, and interference reduced load value, as experienced by a plurality of user equipment 120.

In further addition, the processing circuitry 420 may also be configured to perform the interference cancellation process as an iterative process, performed in multiple stages and wherein at least some of the actions of: estimating 304 the interference cancellation gain and/or controlling 305 the traffic load of the cell 130 may be performed after an intermediate interference cancellation stage but before the interference cancellation process is completed, according to some embodiments.

The processing circuitry 420 may further be configured to determine if any new user equipment 120 will connect to a carrier for which the interference cancellation process is performed. Further, the processing circuitry 420 may also be configured to utilise the interference cancellation gain of the final interference cancellation stage if no new user equipment 120 will connect to the carrier.

The processing circuitry 420 may further be configured to estimate the interference cancellation gain by taking out the inter-cell interference and estimated noise floor power from the total interference, according to some embodiments.

The processing circuitry 420 may be represented by e.g. a Central Processing Unit (CPU), a microprocessor, an Application Specific Integrated Circuit (ASIC) or other processing logic that may interpret and execute instructions. The processing circuitry 420 may perform all data processing functions for inputting, outputting, and processing of data including data buffering and device control functions, such as call processing control, user interface control, or the like.

The network node 110 may further comprise, or be configured for Kalman filtering.

According to some embodiments, the network node 110 also may comprise a receiver 410. The receiver may be configured for receiving wireless signals, e.g. uplink signals transmitted from a user equipment 120.

Also, in further addition, the network node 110 may comprise a transmitter 430. The transmitter 430 is configured to transmit wireless signals, to be received by user equipment 120 situated within the cell 130.

Also, the network node 110 may comprise at least one memory 425, according to some embodiments. The optional memory 425 may comprise a physical device utilized to store data or programs i.e. sequences of instructions, on a temporary or permanent basis. According to some embodiments, the memory 425 may comprise integrated circuits comprising silicon-based transistors. Further, the memory 425 may be volatile or non-volatile. The network node 110 may further according to some embodiments comprise at least one volatile memory 425 and also at least one non-volatile memory 425.

It is to be noted that any internal electronics of the network node 110, not completely necessary for understanding the present method 300 according to the actions 301-305 has been omitted from FIG. 4, for clarity reasons.

Further, it is to be noted that some of the described units 410-430 comprised within the network node 110 are to be regarded as separate logical entities but not with necessity separate physical entities. To mention just one example, the receiver 410 and the transmitter 430 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the network node 110 and the user equipment 120 may comprise both traffic and control signals e.g. paging signals/messages for incoming calls, which may be used to establish and maintain a voice call communication with another party or to transmit and/or receive data, such as SMS, e-mail or MMS messages, with a remote user equipment.

The actions 301-305 in the network node 110 may be implemented through one or more processing circuitry 420 in the network node 110, together with computer program code for performing the functions of the present actions 301-305.

Thus a computer program product, comprising instructions for performing the actions 301-305 in the network node 110 may provide load control in a cell 130 in the wireless communication system 100, when the computer program product is loaded into the processing circuitry 420.

The computer program product mentioned above may be provided for instance in the form of a data carrier carrying computer program code for performing the method steps according to the present solution when being loaded into the processing circuitry 420. The data carrier may be e.g. computer readable storage medium such as a hard disk, a CD ROM disc, a memory stick, an optical storage device, a magnetic storage device or any other appropriate medium such as a disk or tape configured for holding machine readable data. The computer program code may furthermore be provided as program code on a server and downloaded to the network node 110 remotely, e.g. over an Internet or an intranet connection.

Further, a computer program product comprising instructions for performing at least some of the actions 301-305 may be used for implementing the previously described method 300 in the network node 110 for providing load control in a cell 130 in the wireless communication system 100, when the computer program product is loaded into the processing circuitry 420.

When using the formulation "comprise" or "comprising" it is to be interpreted as non-limiting, i.e. meaning "consist at least of". The present methods and network nodes are not limited to the above described preferred embodiments. Various alternatives, modifications and equivalents may be used. Therefore, the above embodiments are not to be taken as limiting the scope of the present methods and network nodes, which are defined by the appending claims.

The invention claimed is:

1. A method in a network node for load control in a cell in a wireless communication system, the method comprising:
   starting an interference cancellation process, for reducing interference between uplink signals;
   estimating an interference cancellation gain, relative to an interference reduced received uplink signal power resulting from the interference cancellation process, wherein the interference cancellation gain is estimated after the start of the interference cancellation process but before the interference cancellation process is completed, wherein the estimation of the interference cancellation gain comprises comparing an air interface load target value with an interference reduced load value, which interference reduced load value is calculated by estimating an interference reduced received total uplink signal power value in an interference cancelling receiver, divided with an estimated noise floor power value, which interference reduced received total uplink signal power value and noise floor power value are estimated after the start of the interference cancellation process but before the interference cancellation process is completed; and
   controlling the traffic load of the cell, by considering the estimated interference cancellation gain.

2. The method of claim 1, further comprising:
   determining an air interface load value, relative to a total received uplink signal power of the uplink signals, before the interference cancellation process is started;
   wherein the estimation of the interference cancellation gain comprises measuring the interference reduced received total uplink signal power value in the interference cancelling receiver, dividing it with the estimated noise floor power value, thereby acquiring the interference reduced load value and determining a difference between the air interface load value and the interference reduced load value; and wherein the traffic load of the cell is controlled by adjusting an air interface load target value by addition of the estimated interference cancellation gain.

3. The method of claim 2, wherein the estimation of the interference cancellation gain is based on collected statistics over a period of time on differences between air interface load values and respective interference reduced load values, as experienced by a plurality of user equipments.

4. The method of claim 2, wherein the air interface load target value is a rise over thermal target value, while the air interface load value is a rise over thermal value determined by measuring the total received uplink signal power of the uplink signals divided by the estimated noise floor power value.

5. The method of claim 1, wherein the interference reduced load value is estimated by the further action of determining an air interface load value, and scaling by a scaling factor, which scaling factor is based on an instantaneous interference cancellation gain.

6. The method of claim 5, wherein the scaling factor is based on collecting statistics over a period of time, on differences between the respective air interface load value, and interference reduced load value, as experienced by a plurality of user equipments.

7. The method of claim 1, wherein the interference cancellation process is an iterative process performed in multiple stages and wherein at least one of the actions of estimating the interference cancellation gain and controlling the traffic load of the cell is performed after an intermediate interference cancellation stage but before the interference cancellation process is completed.

8. The method of claim 1, wherein the interference cancellation process is an iterative process performed in multiple stages, and the method further comprises:
   determining if any new user equipment will connect to a carrier for which the interference cancellation process is performed; and
   if so, performing at least one of the actions of estimating the interference cancellation gain and controlling the traffic load of the cell; otherwise,
   if no new user equipment will connect to the carrier, instead utilizing the interference cancellation gain of a final interference cancellation stage among the multiple stages.

9. The method of claim 1, wherein the interference cancellation gain is estimated by subtracting inter-cell interference power and estimated noise floor power from a total interference power.

10. A network node for load control in a cell in a wireless communication system, said network node comprising:
    a processing circuitry configured to:
       start an interference cancellation process, for reducing interference between uplink signals;
       estimate an interference cancellation gain relative to an interference reduced received uplink signal power resulting from the interference cancellation process, wherein the interference cancellation gain is estimated after the start of the interference cancellation process but before the interference cancellation process is completed, wherein the interference cancellation gain is estimated by comparing an air interface load target value with an interference reduced load value, which interference reduced load value is calculated by estimating an interference reduced received total uplink signal power value in an interference cancelling receiver, divided with an estimated noise floor power value, which interference reduced received total uplink signal load value and noise floor power value are estimated after the start of the interference cancellation process but before the interference cancellation process is completed; and
       control the traffic load of the cell, by considering the estimated interference cancellation gain.

11. The network node of claim 10, wherein the processing circuitry is further configured to:
    determine an air interface load value, relative to a total received uplink signal power of the uplink signals, before the interference cancellation process is started;
    estimate the interference cancellation gain by measuring the interference reduced received total uplink signal power value in the interference cancelling receiver, dividing it with the estimated noise floor power value, thereby acquiring the interference reduced load value and determining the difference between the air interface load value and the interference reduced load value; and
    control the traffic load of the cell, by adjusting an air interface load target value by addition of the estimated interference cancellation gain.

12. The network node of claim 11, wherein the processing circuitry is further configured to:
    estimate the interference cancellation gain based on collected statistics over a period of time on differences between air interface load values and respective interference reduced load values, as experienced by a plurality of user equipments.

13. The network node of claim 11, wherein the air interface load target value is a rise over thermal target value while the air interface load value is a rise over thermal value which is determined by measuring the total received uplink signal power of the uplink signals divided by the estimated noise floor power value.

14. The network node of claim 10, wherein the processing circuitry is further configured to estimate the interference reduced load value by determining an air interface load value, and scaling by a scaling factor, which scaling factor is based on an instantaneous interference cancellation gain.

15. The network node of claim 14, wherein the processing circuitry is further configured to determine a scaling factor, by collecting statistics over a period of time, on differences between the respective air interface load value, and interference reduced load value, as experienced by a plurality of user equipments.

16. The network node of claim 10, wherein the processing circuitry is further configured to perform the interference cancellation process as an iterative process, performed in multiple stages and wherein at least one of estimating the interference cancellation gain and controlling the traffic load of the cell is performed after an intermediate interference cancellation stage but before the interference cancellation process is completed.

17. The network node of claim 10, wherein the interference cancellation process is an iterative process performed in multiple stages, and wherein the processing circuitry is further configured to:
    determine if any new user equipment will connect to a carrier for which the interference cancellation process is performed; and
    utilize the interference cancellation gain of a final interference cancellation stage among the multiple stages, if no new user equipment will connect to the carrier.

18. The network node of claim 10, wherein the processing circuitry is further configured to estimate the interference cancellation gain by subtracting inter-cell interference power and estimated noise floor power from a total interference power.

* * * * *